Feb. 5, 1957
A. POSNER
2,780,221
TONOMETER ADJUNCT FOR OPHTHALMOLOGY
Filed Nov. 1, 1954
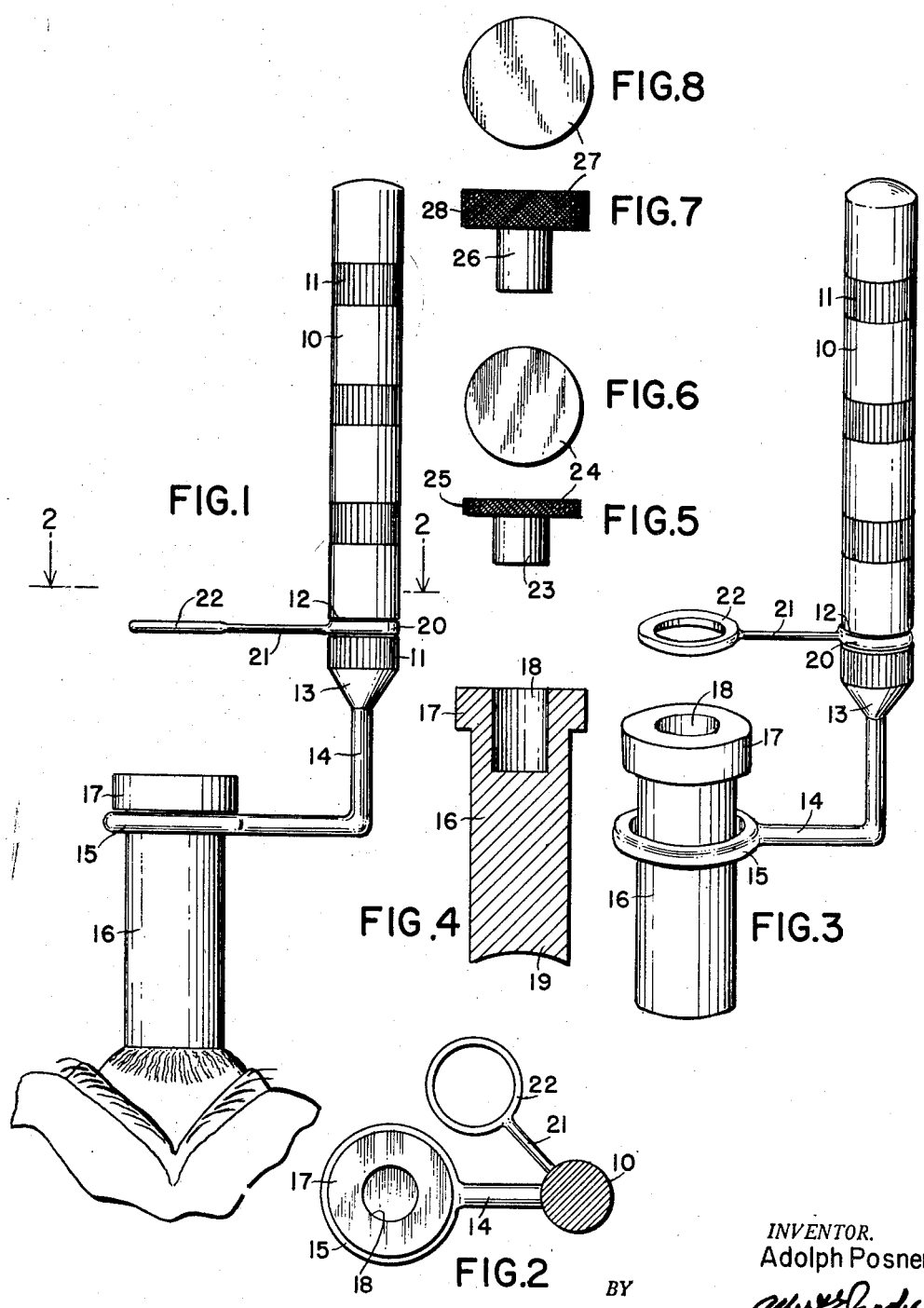
INVENTOR.
Adolph Posner
ATTORNEY

United States Patent Office 2,780,221
Patented Feb. 5, 1957

2,780,221

TONOMETER ADJUNCT FOR OPHTHALMOLOGY

Adolph Posner, New York, N. Y.

Application November 1, 1954, Serial No. 465,871

5 Claims. (Cl. 128—2)

This invention relates to a device for use in ophthalmology with special reference to the diagnosis of glaucoma and more particularly to a tonometer adjunct which can be used interchangeably with a mechanical or an electronic tonometer in carrying out measurements of the rate of outflow of fluid from the eye or of its reciprocal, its resistance offered by the drainage channels to the outflow of fluid from the eye.

A procedure now in use for clinical measurement of the facility of outflow of aqueous from the eye is known as tonography. It is based on the principle that a tonometer when placed on the eyeball causes an increase in the intraocular pressure and this increase in pressure acts as a stimulus to force additional aqueous out of the eyeball. Tonography is carried out in the following manner: Either a mechanical or an electronic tonometer is used. The tonometer is placed on the cornea and the scale reading is noted. The scale reading represents the depth to which the cornea has been indented by the plunger of the tonometer. The amount of the indentation of the cornea and thus the amount of deflection of the pointer on the scale indicates the height of the intraocular pressure. The tonometer is left resting on the cornea for a varying period usually about four minutes. The weight of the tonometer acts as a compressor and causes aqueous to be drained out of the eyeball. The amount of fluid thus lost from the eyeball can be determined by measuring the change in the depth of indentation in the cornea. This change of indentation is determined by noting the change in the scale reading of the tonometer during the time of compression. In this test the tonometer acts both as a measuring instrument and as a compressor. The compression is a function of the weight of the instrument and the surface of contact between the instrument and the eyeball. The rate of aqueous outflow, represented by the coefficient of outflow, can be computed for each eye by using certain formulas. These values vary depending on whether the eye is normal or glaucomatous. The test thus serves as an aid in the diagnosis of glaucoma.

In the measurement of aqueous outflow the tonometer is indispensable as a measuring instrument, but it is not necessary to use the tonometer as a compressor and it is used as such only for convenience. For reasons which will be given, it is advantageous to substitute a special device to act as a compressor on the eye, and to use the tonometer only to measure the intraocular pressure before and after the period during which the eye is compressed.

The device used for compressing the eyeball constitutes my invention and is hereinafter termed a tonometer adjunct. This device is better suited to the purpose than the tonometer, either the mechanical or the electronic because (1) the mechanical tonometer has a higher center of gravity which makes it top-heavy, so that it does not rest firmly on the cornea; (2) over a period of four minutes, the movements of the tonometer are apt to abrade the cornea for, in either type of tonometer, three circular edges are in contact with the cornea, one edge belonging to the lower surface of the plunger and the other two edges belonging to the foot plate of the cylinder within which the plunger moves so that roughness or sharpness of any of these three edges may damage the cornea; and (3) it is difficult to clean and sterilize either type of tonometer adequately before use, this fact making it unsafe to use the tonometer for a prolonged period of time, as bacteria or viruses can gain access into the tissues of the eyeball through an abrasion produced by the contact of the tonometer with the cornea.

My invention consists of a simple device which obviates most of the objectionable features of the tonometer.

The device has a low center of gravity; it does not have a plunger so that only one edge is in contact with the cornea; it is made of solid stainless steel brought to a high polish and with no plating to wear off. It can be easily and effectively cleaned and sterilized either by boiling or by flaming. It is inexpensive, does not require calibration, and does not require any periodic repair. It can be used interchangeably with a tonometer of either the mechanical or the electronic type. When used in conjunction with the tonometer, it enables the ophthalmologist to differentiate between glaucomatous and normal eyes. Its weight is the same as that of the tonometer. Its dimensions are the same. The primary difference between the tonometer and my invention is that the latter does not have a plunger so that the weight distribution upon the surface of contact between the instrument and the eyeball is slightly different from that of the tonometer. For this reason, the criteria and the formulas used in the diagnosis of glaucoma with the method involving the use of my invention have to be modified slightly in relation to the criteria used in the conventional method of tonography. In the new tonometer adjunct, the metal cylinder weighs 16.5 grams, which weight is equal to that of the Schioetz tonometer (excluding its handle), including the plunger and the conventionally attached 5.5 gram load. For purposes of convenience, the cylinder is provided with the marking "5.5." The 2 and 4.5 gram supplement weights or loads, hereinafter referred to, are marked "7.5" and "10" so that, when used, they are also equivalent to the similarly marked tonometer loads, thus eliminating additional calculations and avoiding the possibility of mistake.

One of the objects of the invention, therefore, is to provide a device or adjunct for use in ophthamology which will make it possible to conduct studies on the aqueous outflow of the eye in a better and safer manner than has heretofore been possible.

Another object of the invention resides in a simple instrument to be used as an adjunct to a standard mechanical or electronic Schioetz or other tonometer by means of which there can be conducted in a simple and effective manner the necessary four minute weighting of the eye between measurements of tension.

Other and further objects and advantages of the invention will be understood by those skilled in ophthalmology and tonometry or will be apparent or pointed out hereinafter.

In the accompanying drawing wherein a preferred embodiment of the invention has been illustrated:

Fig. 1 is a side elevational view of a tonometer adjunct embodying the invention and showing the weight member thereof in place upon a human eye;

Fig. 2 is a sectional view, partially in plan, taken along line 2—2 of Fig. 1 and showing the guard means in a displaced position;

Fig. 3 is a perspective view of my new tonometer adjunct;

Fig. 4 is a vertical medial sectional view taken through the weight member of Figs. 1 and 3 and Figs. 5-8 illustrate supplemental weights for increasing the weight of the weight member by specific known amounts.

Referring now to the drawings in detail, the numeral 10 designates a relatively elongated, slender handle means of aluminum which is provided along its length with spaced antislip bands 11 in order to prevent undesired relative vertical movement during manual use. The handle means 10 is also provided with an annular groove 12 adjacent one end and that same end is, moreover, reduced in thickness by means of the frusto-conical portion 13 which merges into a right-angled rod-like shank portion 14 terminating in a ring 15. The shape and length of portion 14 is important in order that the handle and weight will not be in the same vertical plane, or nearly so. The numeral 16 indicates a cylindrical member of known weight which in this case weighs exactly 16.5 grams. The upper end of the member 16 is provided with an enlarged annular flange 17 and an axial recess 18. The lower end of the member 16 is concave and the concavity is so dimensioned that it has a radius of 15 millimeters, the diameter of the cylindrical member 16 itself being 10.1 millimeters. It will be apparent, therefore, that the lower concave end of the weight member 16 which comes in contact with the eye, shown diagrammatically in Fig. 1, is constructed and dimensioned so as to be comfortably and properly received upon the eye and having a single line contact with the eye. It will be observed from Figs. 1 and 3, in particular, that the weight member 16 is loosely mounted in ring 15 and is adapted to move up and down in such ring, as required, and that the enlarged annular flange 17 acts to delimit downward movement of member 16 within the ring and to prevent its inadvertent disassembly therefrom. A guard member is also provided which is swingably mounted on the handle means 10 by a circular band 20 fitting in the said groove 12 and which has a guard ring 22 connected thereto by means of a shank or rod portion 21. When the invention is in use the guard ring 22 is in axial alignment with the ring 15 and serves to prevent the accidental or inadvertent dissociation of weight member 16 from its ring 15 during handling of the instrument, but, when it is desired to remove weight member 16 from its ring, the guard ring is swung into an inactive position, such as is shown in Fig. 2, for example.

Since it may be desired to increase the weight of the weight member 16 by a known amount for correlation with a standard tonometer, supplemental loads or weights are provided as shown in Figs. 5-8. The supplemental weight of Figs. 5 and 6, which weighs exactly 2 grams, is composed of a shank portion 23 receivable within recess 18 of weight 16 and a head 24 adapted to rest on flange 17 when the weight is in use. The peripheral surface of head 24 is double-knurled as shown at 25. The supplemental weight of Figs. 7 and 8 is constructed similarly to that of Figs. 5 and 6 but weighs exactly 4.5 grams. This supplemental weight also consists of a shank portion 26 adapted to be received in the recess 18 of weight 16 and a head portion 27 double-knurled on its peripheral surface at 28 and adapted to rest on the flange 17. The enlarged heads 24 and 27 facilitate adding a weight to or removing it from member 16, the knurled peripheries ensuring a firm grip on the weights.

The weight members is composed of chromium nickel steel or other type of stainless steel brought to a mirror finish and having its edges smoothed or rounded to avoid possibility of trauma to the cornea of the eye. Thus it is not only rustless but can be readily sterilized by boiling the entire instrument or by heating the cylinder in the flame of an alcohol lamp or Bunsen burner.

In use, after a standard tonometer of equivalent weight has been applied as explained above, the weight member 16 is inserted in the ring 15, the guard ring 22 positioned thereover as shown in Fig. 3 and the weight member 16 lowered by the opthalmologist, while holding the handle means firmly, on to the eyeball and the full weight of the member 16 allowed to rest on the cornea of the eye for a predetermined or known period of time, namely, 4 minutes, subsequent to which the instrument is removed and a standard tonometer of equivalent weight again placed in a comparable position. While the weight member 16 rests upon the eyeball, it causes a proportionate compression so that with the initial and final tonometer readings, the coefficient of outflow can be computed.

In a standard tonometer, as noted, provision is made for increasing the weight of the plunger by known increments of 2 grams and 4.5 grams so as to make the total weight of the plunger assembly 7.5 and 10 grams, respectively, and the total weight of the tonometer 18.5 and 21 grams, respectively. In the instrument constituting the present invention it is made possible to apply weights of 16.5 grams, 18.5 grams and 21 grams, respectively. The invention is, however, not to be limited to the particular weight or weight-increments specified.

The present instrument, therefore, fills a long-felt need which has not heretofore been supplied so far as I am aware and makes it possible by means of a simple, safe, inexpensive, effective and reliable instrument to obtain highly useful and valuable information concerning the state of a human eye, especially one which is glaucomatous or suspected of being so.

The invention is defined by the appended claims.

I claim:

1. A tonometer adjunct for ophthalmology comprising a cylindrical member of known weight having a concave bottom and an axially recessed top terminating in an annular flange, holding and guiding means for said member and in which said member is adapted to slide, guard means disposed above said member and preventing said member from becoming disassociated from said holding and guiding means, and handle means on which the said holding and guiding means and the said guard means are mounted for manipulative operation of said tonometer adjunct, said holding and guiding means being rigidly connected to said handle means by an angular extension thereof and said guard means being swingable on said handle means at a right angle to the major axis of the said member and handle means.

2. A tonometer adjunct for ophthalmology comprising a cylindrical member of known weight having a concave bottom and an axially recessed top terminating in an annular flange, holding and guiding means for said member and in which said member is adapted to slide, guard means disposed above said member and preventing said member from becoming disassociated from said holding and guiding means, and handle means on which the said holding and guiding means and the said guard means are mounted for manipulative operation of said tonometer adjunct, said holding and guiding means and said guard means each including a metal ring and said member extending through the ring of the holding and guiding means and having its movement therein delimited in one direction by said annular flange and in the opposite direction by said guard ring.

3. A tonometer adjunct for ophthalmology comprising a cylindrical member of known weight having a concave bottom and an axially recessed top terminating in an annular flange, holding and guiding means for said member and in which said member is adapted to slide, guard means disposed above said member and preventing said member from becoming disassociated from said holding and guiding means, and handle means on which the said holding and guiding means and the said guard means are mounted for manipulative operation of said tonometer adjunct, said handle means being offset with respect to said member and being provided with spaced anti-slip areas along its length.

4. A tonometer adjunct for ophthalmology comprising a cylindrical member of known weight having a concave bottom and an axially recessed top terminating in an annular flange, holding and guiding means for said member and in which said member is adapted to slide, guard means disposed above said member and preventing said member from becoming disassociated from said holding and guiding means, and handle means on which the said holding and guiding means and the said guard means are mounted for manipulative operation of said tonometer adjunct, and a plurality of supplemental weights addible to and subtractible from said member and each of which has a shank portion adapted to be received in the recess of the member and a head portion adapted to overlie said annular flange.

5. A tonometer adjunct for ophthalmology which comprises an elongated slender handle having an annular groove adjacent one end and a reduced shank-like right-angled portion at the same end terminating in a metal ring, a guard mounted in said annular groove and terminating in a metal ring adapted for axial alignment with the first-named ring and serving as a stop, a cylindrical weight loosely mounted in said first-named ring and having an annular flange at its upper end delimiting downward movement of said weight, upward movement of said weight being delimited by said guard ring and said weight having at its lower end a concavity dimensioned to rest with a single line contact upon a human eye.

References Cited in the file of this patent

FOREIGN PATENTS 468,143  Germany _____ Nov. 7, 1928